April 4, 1961 J. F. MILLER ET AL 2,978,661
SEMICONDUCTOR DEVICES
Filed March 3, 1959

INVENTORS
JAMES F. MILLER
RICHARD C. HIMES
BY Gray, Mase & Dunson
ATTORNEYS 2,978,661

SEMICONDUCTOR DEVICES

James F. Miller, Columbus, and Richard C. Himes, Westerville, Ohio, assignors to Battelle Memorial Institute, Columbus, Ohio, a corporation of Ohio Filed Mar. 3, 1959, Ser. No. 796,954

12 Claims. (Cl. 338—22)

This invention relates to semiconductors for electrical devices such as resistors, rectifiers, amplifiers, detectors, control devices, generators, photo cells, thermo-electric devices, galvanomagnetic devices, and the like. These new semiconductors provide distinct advantages over those developed and employed in the past.

Figure 1:
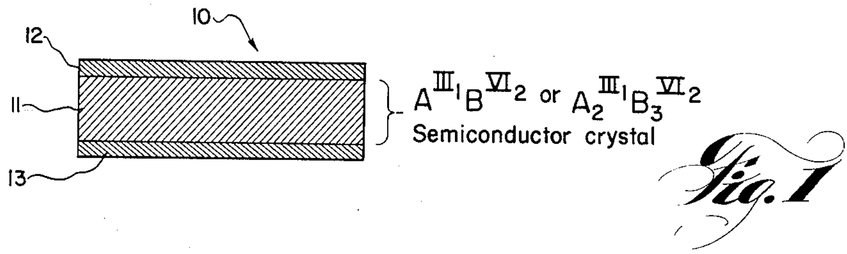
Fig. 1 is a cross-sectional view of a typical semiconductor device according to the present invention.

During the last several years, semiconducting materials, particularly crystalline materials of the fourth group of the periodic table and of compounds comprising elements of the third and fifth groups, have become important as components for the generation and control of electrical currents and in the detection and transmission of electromagnetic radiation. Such materials are described at length in the technical literature and are the subject of a number of patents. Of these materials, the total number of useful materials available is small and the range of usefulness of each is rather limited. Applications are limited not only by difficulty of preparation in useful form, and by cost, but also by the basic electrical and optical properties of the individual materials. That greater ranges and greater flexibility of semiconductors are needed, is attested by the great volume of work which has been published in recent years on alloy systems comprising different elements of group IV or different compounds of group III with group V elements. A further serious limiting factor is the lack of high temperature stability among materials having energy gaps in the range suitable for most applications, e.g., about 0.1 to a few electron volts.

The present invention overcomes these problems by making available a group of new semiconductor materials which make possible great latitude in the selection of material for use in a device tailored to a particular requirement. A semiconductor device according to this invention comprises a compound of an element($A^{III_1}$) of the first subgroup of group III of the periodic system with an element ($B^{VI_2}$) of the second subgroup of group VI together with the electrical contacts thereto. These compounds generally have the formula $A^{III_1}B^{VI_2}$ or $A_2^{III_1}B_3^{VI_2}$. Included are compounds such as the selenides and tellurides of the rare-earth metals and yttrium and scandium. It has been found as part of the present invention that such compounds are semiconductors and offer a broad gradual alteration of properties as one proceeds from element to element in the rare-earth series. For example, compounds have been prepared with room-temperature resistivities as follows: $La_2Te_3$, $1.9\times10^{-4}$ ohm-cm; $Er_2Te_3$, $1.1\times10^{-3}$ ohm-cm; $Gd_2Te_3$, $1.9\times10^{-2}$ ohm-cm; $Y_2Te_3$, 10 ohm-cm. A similar trend is noted among the selenides; e.g. $La_2Se_3$, 0.024 ohm-cm; $Er_2Se_3$, 7.9 ohm-cm. It should be noted here that in these series of compounds yttrium occupies the position of a rare earth of high atomic weight as would be predicted from comparison of ion radii. It has also been noted that a 1–1 compound has lower resistivity at room temperature than the corresponding 2–3 compound: e.g. ErSe, $1.7\times10^{-4}$ ohm-cm, $Er_2Se_3$ 7.9 ohm-cm. These materials all have high melting points, in the range of 1400 to 2000° C., and yet useful energy gaps are observed, e.g. $\Delta E$ ($Gd_2Te_3$)$\cong$0.7 ev. Excursions to temperatures near 1000° C. have been experienced without permanent effect upon the electrical properties of the compound.

Certain of the compounds included in this invention are quite strongly paramagnetic. Thus, these compounds make it possible to provide new semiconductor devices which exploit the paramagnetic nature of the compounds and the interactions between magnetic field and electrical field which are observed in the materials.

The materials should be prepared in high purity as compact crystalline bodies, as by (1) reaction of an anhydrous halide of the metal with hydrogen selenide or hydrogen telluride gas, or (2) direct reaction of the metal, in granular form, with vapor of the metalloid, and subsequent melting in a nonreactive container such as tantalum or periclase, under carefully controlled conditions of temperature and pressure. Such procedure usually produces sound ingots of n-type material (i.e., material in which electrons are the dominant current carriers). P-type material (i.e., material in which hole conduction predominates) may be produced from those ingots by introduction of foreign impurities such as copper or by adjusting composition by heat treating under appropriate conditions. A p-n junction (i.e., a narrow region within a continuous mass, on one side of which region the material is p-type and on the other side of which the material is n-type) may be created by diffusion of the p-type impurity into the mass from one surface. Other customary methods may also be used to provide junctions. Such junctions are required in many devices, such as junction rectifiers and photo cells. For some purposes it is desirable that the body comprise a single crystal. Such crystals may be provided by the various customary methods.

To summarize, a semiconductor device according to this invention comprises a crystalline body and electrical connecting means in contact therewith, the body consisting essentially of a compound of an element of the first subgroup of group III of the periodic system (i.e. elements 21, 39, 57–71, and 89–103) with an element of the second subgroup of group VI of the periodic system (i.e. elements 8, 16, 34, 52, and 84). Very good results are obtainable with selenides and tellurides of scandium, yttrium, and the type 4*f* rare earth metals. The selenides include monoselenides and sesquiselenides, and the tellurides include monotellurides and sesquitellurides. Specific examples of interest are the selenides and tellurides of yttrium, lanthanum, gadolinium, and erbium.

At least a portion of the compound body may contain a trace of donor impurity and have n-type conductance because of the presence of such impurity. Similarly, at least a portion of the compound body may contain a trace of acceptor impurity and have p-type conductance because of the presence of such impurity. The body may have a plurality of zones of different electrical conductance. In the different zones, comprising the same compound, at least one zone may contain in the compound a trace of acceptor impurity and thus have p-type conductance and at least one other zone may contain in the compound a trace of donor impurity and thus have n-type conductance.

Referring now to Fig. 1, a typical semiconductor device 10, according to the present invention, comprises a body 11 made of a semiconductor crystal consisting essentially of a compound of an element of the first subgroup of group III of the periodic system with an element of the second subgroup of group VI of the periodic system. A conductor 12 made of any suitable metal or other electrically conductive material is connected to the upper surface of the semiconductor body 11. A conductor 13 made of any suitable metal or other electrically conductive material is connected to the lower surface of the semiconductor body 11.

Figure 2:
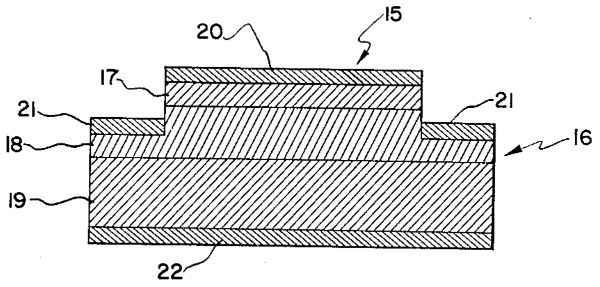
Fig. 2 is a cross-sectional view of another typical semiconductor device according to the present invention.

Fig. 2 illustrates another typical semiconductor device according to the present invention. In this device 15, a body 16 is made of a semiconductor crystal consisting essentially of a compound of an element of the first subgroup of group III of the periodic system with an element of the second subgroup of group VI of the periodic system. The semiconductor body 16 includes an upper zone 17 having one type of conductivity, a middle zone 18 having conductivity of the type opposite from that of the upper zone 17, and a lower zone 19 having conductivity of the type opposite to that of the adjacent zone 18 and of course of the same type as the conductivity of the upper zone 17. A conductor 20 is connected to the upper surface of the upper zone 17, conductors 21 are connected to a surface of the middle zone 18, and a conductor 22 is connected to the lower surface of the lower zone 19.

In one form of the device 15, the upper zone 17 of the body 16 has p-type conductivity, the middle zone 18 has n-type conductivity, and the lower zone 19 has p-type conductivity. An example of such a device is a p-n-p junction transistor. In another form of the device 15, the upper zone 17 of the semiconductor body 16 has n-type conductivity, the middle zone 18 has p-type conductivity and the lower zone 19 has n-type conductivity. An example of such a device is an n-p-n junction transistor. In the p-n-p semiconductor device, the upper zone 17 and the lower zone 19 each contain in the semiconductor compound a trace of acceptor impurity, while the middle zone 18 contains a trace of donor impurity. In the n-p-n device, the upper zone 17 and the lower zone 19 each contain a trace of donor impurity, and the middle zone 18 contains a trace of acceptor impurity in the semiconductor compound.

Figure 3:
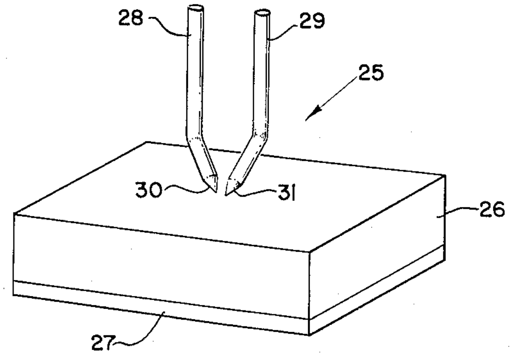
Fig. 3 is a perspective view of still another typical semiconductor device according to the present invention.

Fig. 3 shows a typical form of point contact semiconductor device according to the present invention. In this device 25, a semiconductor body 26 consists essentially of a compound of an element of the first subgroup of group III of the periodic system with an element of the second subgroup of group VI of the periodic system.

A conductor 27 is connected to the lower surface of the semiconductor body 26. Conductors 28 and 29, having sharp pointed ends 30 and 31, respectively, are connected to the upper surface of the semiconductor body 26, with the pointed ends 30 and 31 contacting the semiconductor body 26 in close proximity to each other. An example of this type of device is a point contact transistor.

The drawings are merely illustrative of the many shapes and forms that a semiconductor device according to the present invention may have and are not intended to limit the invention in any way.

What is claimed is:

1. A semiconductor device comprising a crystalline body and electrical connecting means in contact therewith, said body consisting essentially of a compound selected from the group consisting of selenides and tellurides of yttrium, lanthanum, gadolinium, and erbium.
2. A semiconductor device according to claim 1, said body consisting of a selenide.
3. A semiconductor device according to claim 1, said body consisting of a telluride.
4. A semiconductor device according to claim 1, said body consisting of a compound of yttrium.
5. A semiconductor device according to claim 1, said body consisting of a compound of lanthanum.
6. A semiconductor device according to claim 1, said body consisting of a compound of gadolinium.
7. A semiconductor device according to claim 1, said body consisting of a compound of erbium.
8. A semiconductor device according to claim 1, said body consisting of gadolinium sesquitelluride.
9. A semiconductor device according to claim 1, said body consisting of yttrium sesquitelluride.
10. A semiconductor device according to claim 1, said body consisting of erbium sesquitelluride.
11. A semiconductor device according to claim 1, said body consisting of erbium sesquiselenide.
12. A semiconductor device according to claim 1, said body consisting of lanthanum sesquiselenide.

References Cited in the file of this patent

UNITED STATES PATENTS

| | | |
|---|---|---|
| 1,682,846 | Kremers | Sept. 4, 1928 |
| 2,226,715 | Geisler | Dec. 31, 1940 |
| 2,664,486 | Colpitts | Dec. 29, 1953 |

OTHER REFERENCES

Seaborg, Glen T. (Book): The Transuranium Elements; Yale University Press, 1958 (pages 295–300 of interest).